H. S. WRIGHT.
THERMOMETER CASE.
APPLICATION FILED FEB. 2, 1917.
1,257,060.
Patented Feb. 19, 1918.
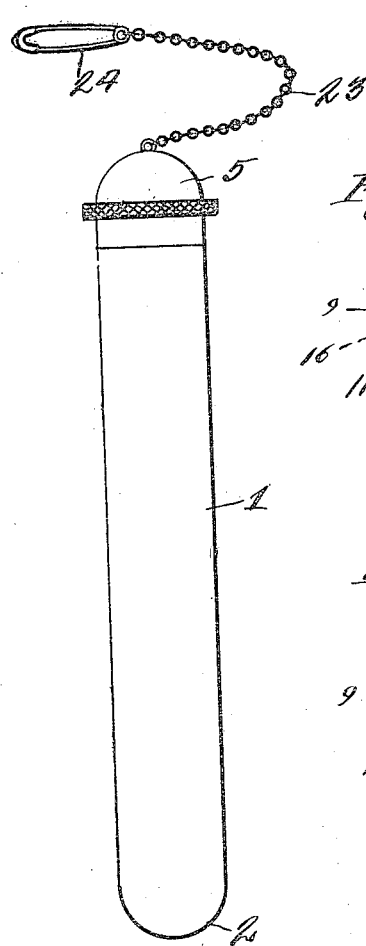
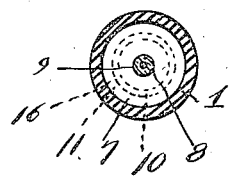
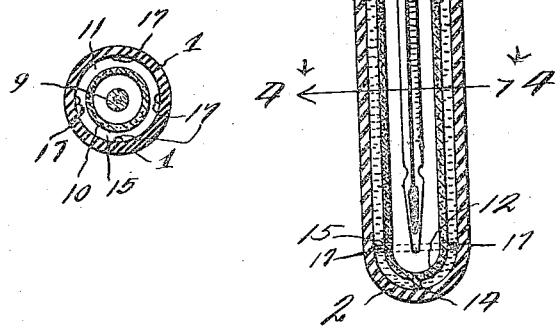

UNITED STATES PATENT OFFICE.

HARRY SYMNS WRIGHT, OF JEROME, IDAHO.

THERMOMETER-CASE.

1,257,060.  Specification of Letters Patent.  Patented Feb. 19, 1918.

Application filed February 2, 1917. Serial No. 146,180.

*To all whom it may concern:*

Be it known that I, HARRY S. WRIGHT, a citizen of the United States, residing at Jerome, in the county of Lincoln, State of Idaho, have invented a new and useful Thermometer-Case; and I do hereby declare the following to be a full, clear, and exact description of the invention, such as will enable others skilled in the art to which it appertains to make and use the same.

This invention relates to an improved casing or case for thermometers used by physicians and the like in taking the temperature of patients.

One of the objects of the invention is to improve, simplify and render more practical the thermometer casing or case illustrated, described and claimed in the application of H. S. Wright, filed April 5, 1916, Serial Number 89,241, allowed August 17, 1916.

Another object of the invention is to provide an outer casing to be constructed of any suitable material, preferably glass, or the like, provided with an inner tube of some suitable absorbent material, there being a space between the inner tube and the outer tube for the reception of some suitable antiseptic solution for saturating the inner tube, whereby the fumes will act as an antiseptic for the thermometer, which enters the inner casing, so that contagion following the repeated use of the thermometer is obviated.

A further object of the invention is to provide means consisting of a rubber washer at the top of the inner casing, through an opening of which the thermometer is inserted, in order to wipe the thermometer as it is inserted and removed.

A further object of the invention is that the washer engages an annular groove of the outer casing to hold the inner casing in place.

A further object of the invention is the provision of a guide adjustable in the outer casing so as to guide the thermometer into the opening of the rubber washer.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in side elevation of the improved thermometer casing.

Fig. 2 is a vertical sectional view through the same showing it constructed in accordance with the invention.

Fig. 3 is a sectional view on line 3—3 of Fig. 2.

Fig. 4 is a transverse section on line 4—4 of Fig. 2.

Referring more especially to the drawings, 1 designates a casing which may be constructed of any suitable material, preferably glass or the like, in the form of a tube closed integrally at one end, as shown at 2, the other end is open and is provided with an exterior threaded reduced part 3, to be engaged by the interior threads 4 of the cap or closure 5. The inner wall of the casing 1 is provided with an annular groove 6, for the reception of the rubber washer 7, which has a central opening 8, smaller in diameter than the cross sectional diameter of the thermometer 9. Arranged in the casing 1 is an inner tubular casing 10, which may be constructed of any suitable absorbent material, for instance, material similar to blotting paper or the like, and which has sufficient stiffness or rigidity, whereby said tube 10 may hold its shape. The inner tube 10 is so arranged in the casing 1 as to provide a space 11 for the reception of any suitable antiseptic solution. The inner tube 10 has its end 12 closed and its end 13 open. The lower extremity 12 of the inner tube has a projection 14, to prevent the end portion 12 from contacting with the inner lower end of the casing 1. The exterior of the inner casing or tube 10 at both ends is provided with annular flanges 15 and 16 which hold the casing 10 spaced from the casing 1. The lower flange 15 is provided with notches 17. The antiseptic solution is first placed in the casing 1, then the inner casing 10 is inserted, the solution passing through said notches 17, so as to fill the space 11 between the inner tube and the casing 1. The flange 16 closes the upper end portion of the space 11, and when the inner tube 10 is so arranged, the rubber washer 7 is then inserted, until it engages the annular groove 6, resting upon the flange 16 thereby preventing the inner tube from moving vertically. Owing to the washer 7 engaging the groove 6 adjacent the flange 16, to hold the inner tube 10 securely in place and against movement, the antiseptic fluid is prevented from passing above the flange 16, and into the interior of the inner tube. The interior of the casing 1 above the washer 7 is provided with threads 18, to be engaged by the threads of the bushing 19, which may be inserted in the casing 1 by using a spanner wrench, not shown, to engage the notches or recesses 20. The bushing 19 is provided with a central guide opening 21, which is alined axially with the opening 8 of the washer 7, and through which opening 21 the thermometer 9 is inserted to guide the same through the opening 8 of the washer 7. When the thermometer passes through the opening 8 of the washer 7, the thermometer is thoroughly wiped. The bushing 19 is provided with a conical depression 22, which guides the thermometer toward the opening 21. The cap or closure has a suitable chain 23 attached thereto, and which chain, in turn, is provided with a suitable fastener or safety pin 24, whereby the thermometer casing may be suspended or attached to the clothing of the physician. The absorbent material of the inner casing 10 absorbs the antiseptic solution, the fumes from which, on the interior of the casing 10 act to sterilize the thermometer, whereby contagion following the repeated use of the thermometer is obviated.

The invention having been set forth, what is claimed as new and useful, is:—

A case for a thermometer, comprising a tubular body closed at one end and open at the other, a tubular casing of absorbent material arranged on the interior of said body and provided with means for holding said interior casing spaced from the inner surface of the body, thereby providing a space for the reception of an antiseptic solution to be absorbed by the tubular casing, and wiping means arranged in the body to wipe the thermometer as it enters the inner casing, and to hold the inner casing in place, said wiping means comprising a rubber washer having a central opening smaller in diameter than the cross sectional diameter of the thermometer, an annular groove on the interior of the body to receive said rubber washer, a bushing adjustable in the body above the washer and provided with a conical depression and a central opening axially alined with the opening of the washer and said depression, to guide the thermometer through the opening of the washer, and a closure for the open end of the body.

In testimony whereof I have signed my name to this specification in the presence of two subscribing witnesses.

HARRY SYMNS WRIGHT.

Witnesses:
GEO. HINEMAN,
FRED H. ZOHN.

Copies of this patent may be obtained for five cents each, by addressing the "Commissioner of Patents, Washington, D. C."